United States Patent
Hu

(10) Patent No.: US 9,148,014 B2
(45) Date of Patent: Sep. 29, 2015

(54) BATTERY PROTECTION CIRCUIT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Ke-You Hu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 40 days.

(21) Appl. No.: 14/093,359

(22) Filed: Nov. 29, 2013

(65) Prior Publication Data

US 2014/0347775 A1    Nov. 27, 2014

(30) Foreign Application Priority Data

May 24, 2013   (CN) .......................... 2013 1 0197274

(51) Int. Cl.
*H02H 3/08*   (2006.01)
*H02H 7/18*   (2006.01)
*H02J 7/00*   (2006.01)

(52) U.S. Cl.
CPC ............ *H02H 7/18* (2013.01); *H02J 2007/004* (2013.01); *H02J 2007/0037* (2013.01)

(58) Field of Classification Search
USPC ................................................. 361/93.7–93.9
See application file for complete search history.

(56) References Cited

U.S. PATENT DOCUMENTS

2002/0121880 A1*   9/2002   Yamanaka et al. ............ 320/134
2013/0027828 A1*   1/2013   Noda et al. ................... 361/93.8

* cited by examiner

*Primary Examiner* — Danny Nguyen
(74) *Attorney, Agent, or Firm* — Novak Druce Connolly Bove + Quigg LLP

(57) ABSTRACT

A battery protection circuit includes a control module, a first switch, and a loading module. The control module includes a second switch. A base terminal of the second switch is connected to a positive terminal of a battery, and an emitter terminal of the second switch is grounded. The first switch includes a gate terminal, a source terminal, and a drain terminal. The gate terminal is connected to the control module and further connected to a collector terminal of the second switch, and the source terminal is grounded. The drain terminal is connected to a first capacitor, and the first capacitor is grounded. The loading module is connected to the battery. When the loading module is abnormal, the gate terminal receives a control signal to switch off the first switch.

18 Claims, 2 Drawing Sheets

BATTERY PROTECTION CIRCUIT

BACKGROUND

1. Technical Field

The present disclosure relates to protection circuits, and particularly to a protection circuit for a battery.

2. Description of Related Art

Lithium battery is used in various electronic devices, such as a camera, a mobile phone, and a notebook computer. The lithium battery comprises a chip and a control module connected to the chip. The control module is used to detect the state of the lithium battery, and when the lithium battery is abnormal, such as overvoltage, overcurrent, or short circuit, the chip works with the control module, for protecting the lithium battery from being damaged. However, when the chip is powered up by the control module, the current sinking through the chip is usually an overcurrent which may damage the chip. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
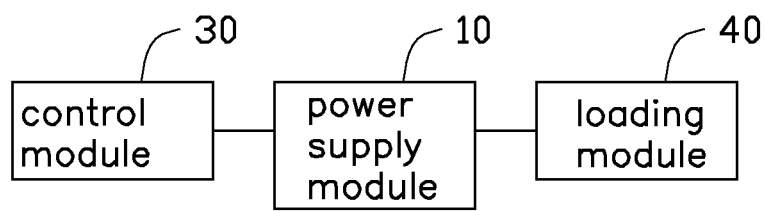
FIG. 1 is a block diagram of a battery protection circuit in accordance with an embodiment.
Figure 2:
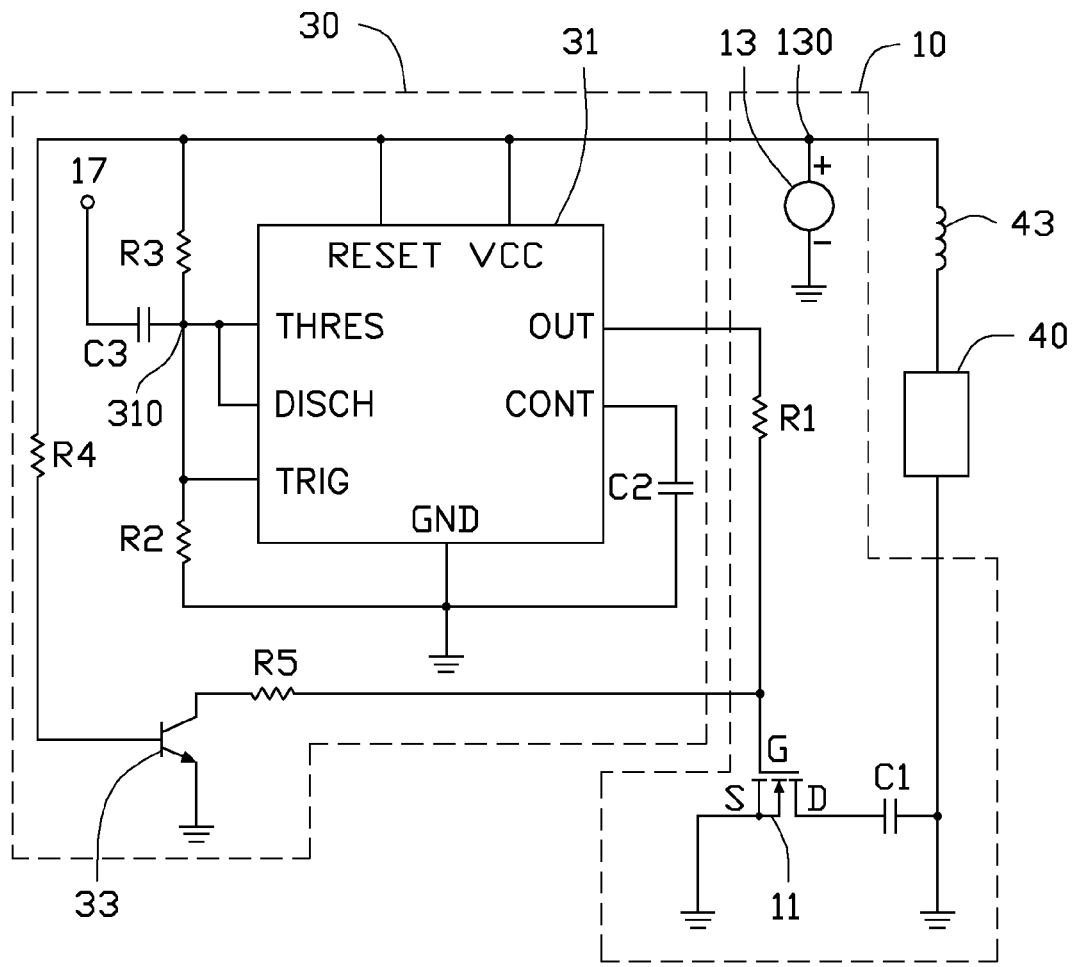
FIG. 2 is a detailed circuit diagram of the battery protection circuit of FIG. 1.

FIGS. 1-2 illustrate a battery protection circuit in accordance with an embodiment comprises a power supply module 10, a control module 30 connected to the power supply module 10, and a loading module 40 connected to the power supply module 10.

The power supply module 10 comprises a first switch 11 and a battery 13. A source terminal of the first switch 11 is grounded. A drain terminal of the first switch 11 is connected to a capacitor C1, and the capacitor C1 is grounded. A gate terminal of the first switch 11 is connected to the control module 30. A positive terminal of the battery 13 is connected to a first node 130, and a negative terminal of the battery 13 is grounded. In one embodiment, the first switch 11 is a metal-oxide-semiconductor field-effect transistor (MOSFET), and when the first switch 11 receives a high level signal, the first switch is rendered conductive, and a model of the first switch 11 is AOT266. The battery 13 is a lithium battery.

The control module 30 comprises a delay chip 31 and a second switch 33. A pin GND of the delay chip 31 is grounded. A pin OUT of the delay chip 31 is connected to the gate terminal of the first switch 11 via a resistor R1. A pin CONT of the delay chip 31 is connected to a capacitor C2, and the capacitor C2 is grounded. A pin TRIG of the delay chip 31 is connected to a second node 310, and the second node 310 is grounded via a resistor R2. A pin THRES and a pin DISCH of the delay chip 31 are connected to the second node 310, and the second node 310 is connected to the first node 130 via a resistor R3. A control terminal 17 is used to receive a control signal and connected to the first node 310 via a capacitor C3. The control terminal 17 is connected to a sensor (not shown). In one embodiment, the sensor, connected to the control terminal 17 and the loading module 40, is used to detect the state of the loading module 40. When the senor detects the loading module 40 is in a normal state, the senor can send a high level signal to the control terminal 17 so that the first switch 11 is rendered conductive. When the sensor senses he loading module 40 is in an abnormal state, such as the loading module 40 is in an overvoltage state, or the loading module 40 is in an overcurrent state, or the loading module 40 is shorted, the sensor can send a low level signal to the control terminal 17. A pin RESET of the delay chip 31 is connected to the first node 130. A pin VCC of the delay chip 31 is connected to the first node 130. A base terminal of the second switch 33 is connected to the first node 130 via a resistor R4. An emitter terminal of the second switch 33 is grounded. A collector terminal of the second switch 33 is connected to the gate terminal of the first switch 11 via a resistor R5. In one embodiment, the delay chip 31 is model number NF555, and a type of the second switch 33 is an npn bipolar junction transistor. A resistance of the resistor R2 is 100 KΩ, a resistance of the resistor R3 is 100 KΩ, a resistance of the resistor R4 is 10 KΩ, and a resistance of the resistor R5 is 1 KΩ. A capacitance of the capacitor C1 is 1.0 uF, and a capacitance of the capacitor C2 is 0.01 uF.

A first connecting terminal of the loading module 40 is connected to the first node 130 via an inductor 43, and a second end of the loading module 40 is grounded.

In use, the battery 13 works normally and outputs a voltage to the loading module 40. The sensor detects the state of the loading module 40. When the sensor detects the loading module 40 is in a normal state, the senor sends a high level to the control terminal 1 and a high level signal is outputted by the control terminal 17. Thus, the first switch 11 can get the high level signal via the delay chip 31 and is rendered conductive. When the loading module 40 is abnormal, such as the loading module 40 is in an overvoltage state, or the loading module 40 is in an overcurrent state, or the loading module 40 is shorted, the sensor connected to the loading module 40 senses the loading module 40 is in the abnormal state. Thus, the sensor sends a low level signal to the control terminal 17. Thus, the first switch 11 is turned off. The low level signal received by the control terminal 17 extends through the capacitor C3 and is inputted into the delay chip 31. The delay chip 31 can delay a time of the control terminal 17 transmitted to the first switch 11, and the speed of switching off the first switch 11 can be decreased. Thus, the battery 13 connected to the loading module 40, when the loading module 40 is in an overvoltage state, or the loading module 40 is in an overcurrent state, or the loading module 40 is shorted, the battery 13 is also in an overvoltage state, or the loading module 40 is in an overcurrent state, or the loading module 40 is shorted. However, the positive terminal of the battery 13 is connected to the source terminal of the first switch 11, and the source terminal of the first switch 11 is grounded. The speed of switching off the first switch 11 is decreased, thus, a part of the overvoltage or overcurrent of the battery 13 flows into the ground, and the battery 13 can be protected via the decreased speed of the first switch 11 being turned off. In one embodiment, a withstand voltage of the first switch 11 is 60V, and a resistance of the $R_{DS}(ON)$ between the source terminal and the drain terminal of the first switch 11.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A battery protection circuit comprising:
a first switch comprising a gate terminal, a source terminal, and a drain terminal; a control module comprising a delay chip and a second switch; the delay chip comprises a pin OUT; a base terminal of the second switch is connected to a positive terminal of a battery, and an emitter terminal of the second switch is grounded; and
a loading module connected to the battery;
wherein the gate terminal is connected to a collector terminal of the second switch and connected to the pin OUT of the delay chip, the source terminal is grounded, the drain terminal is connected to a first capacitor, and the first capacitor is grounded, and when the loading module is in an overcurrent state or in an overvoltage state, the gate terminal is configured to receive a controlling signal to switch off the first switch.

2. The battery protection circuit of claim 1, wherein the gate terminal is connected to the pin OUT of the delay chip via a first resistor and further connected to a first node via a second resistor, the first node is connected to the positive terminal of the battery, a negative terminal of the battery is grounded; and the first node is further connected the loading module via an inductor.

3. The battery protection circuit of claim 1, wherein the collector terminal of the second switch is connected to the gate terminal via a third resistance.

4. The battery protection circuit of claim 2, wherein the base terminal of the second switch is connected to the first node via a fourth resistor.

5. The battery protection circuit of claim 2, wherein a second capacitor configured for receiving the controlling signal, and a second node connected to the second capacitor, the second node is connected to a pin TRIG of the delay chip, and a pin RESET and a pin VCC of the delay chip are connected to the first node.

6. The battery protection circuit of claim 5, wherein a pin THRES and a pin DISCH of the delay chip are connected to the second node.

7. The battery protection circuit of claim 5, wherein the second node is grounded via a fifth resistor.

8. The battery protection circuit of claim 5, wherein a pin CONT of the delay chip is connected to a third capacitor, and the third capacitor is grounded.

9. The battery protection circuit of claim 5, wherein a pin GND of the delay chip is grounded.

10. A battery protection circuit comprising:
a first switch comprising a gate terminal, a source terminal, and a drain terminal;
a control module connected to the first switch and comprising a delay chip and a second switch; the delay chip is connected to the gate terminal of the first switch; a base terminal of the second switch is connected to a positive terminal of a battery, and an emitter terminal of the second switch is grounded; and
a loading module connected to the battery;
wherein the gate terminal is connected to a collector terminal of the second switch and is connected to the control terminal, the source terminal is grounded, the drain terminal is connected to a first capacitor, and the first capacitor is grounded; when the loading module is in an overcurrent state or in an overvoltage state, the delay chip is configured to receive a controlling signal to input into the first switch, so that the speed of the first switch being switched off, is decreased.

11. The battery protection circuit of claim 10, wherein the gate terminal is connected to a pin OUT of the delay chip via a first resistor and connected to a first node via a second resistor, the first node is connected to the positive terminal of the battery, a negative terminal of the battery is grounded; and the first node is further connected to the loading module via an inductor.

12. The battery protection circuit of claim 10, wherein the collector terminal of the second switch is connected to the gate terminal via a third resistance.

13. The battery protection circuit of claim 12, wherein the base terminal of the second switch is connected to the first node via a fourth resistor.

14. The battery protection circuit of claim 12, wherein the control module further comprises a second capacitor configured for receiving the controlling signal, and a second node connected to the second capacitor, the second node is connected to a pin TRIG of the delay chip, and a pin RESET and a pin VCC of the delay chip are connected to the first node.

15. The battery protection circuit of claim 14, wherein a pin THRES and a pin DISCH of the delay chip are connected to the second node.

16. The battery protection circuit of claim 14, wherein the second node is grounded via a fifth resistor.

17. The battery protection circuit of claim 10, wherein a pin CONT of the delay chip is connected to a third capacitor, and the third capacitor is grounded.

18. The battery protection circuit of claim 10, wherein a pin GND of the delay chip is grounded.

* * * * *